Aug. 25, 1953  L. E. POSTON  2,649,802
TRAP HOOK
Filed Jan. 20, 1950  2 Sheets-Sheet 1
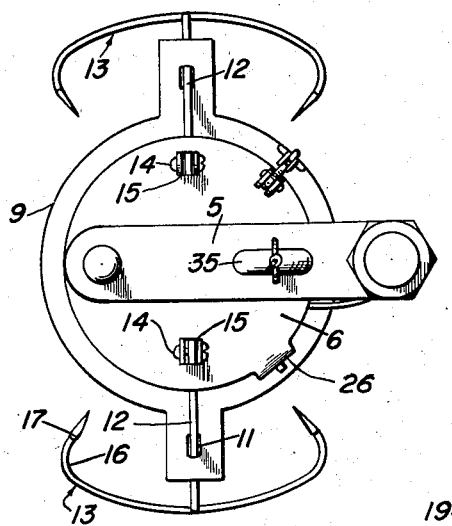
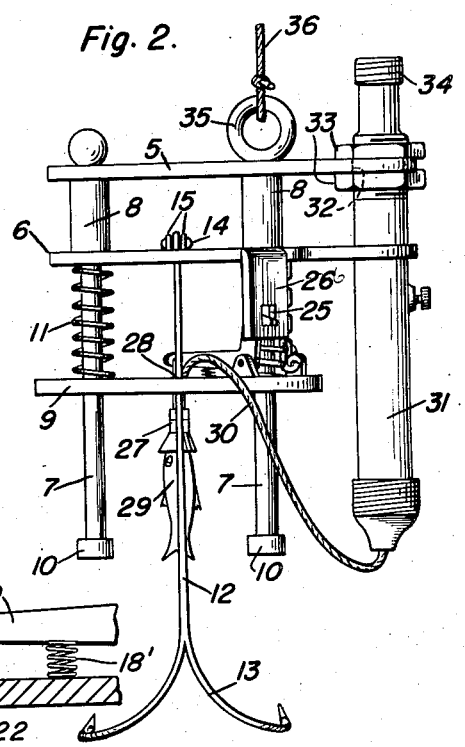
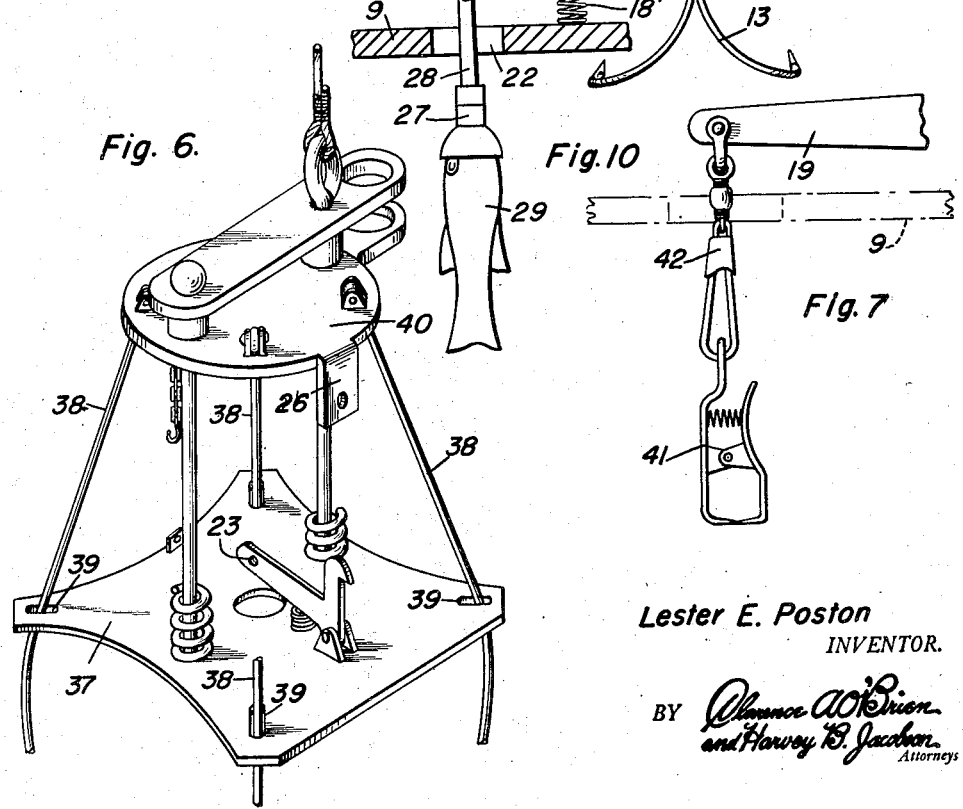
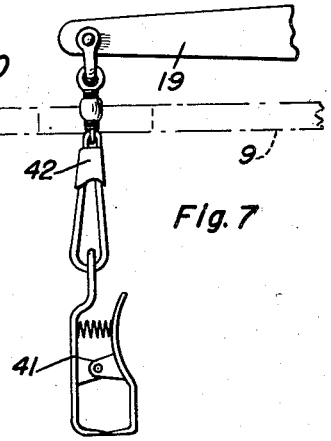
Lester E. Poston
INVENTOR.

Aug. 25, 1953
L. E. POSTON
2,649,802
TRAP HOOK
Filed Jan. 20, 1950
2 Sheets-Sheet 2
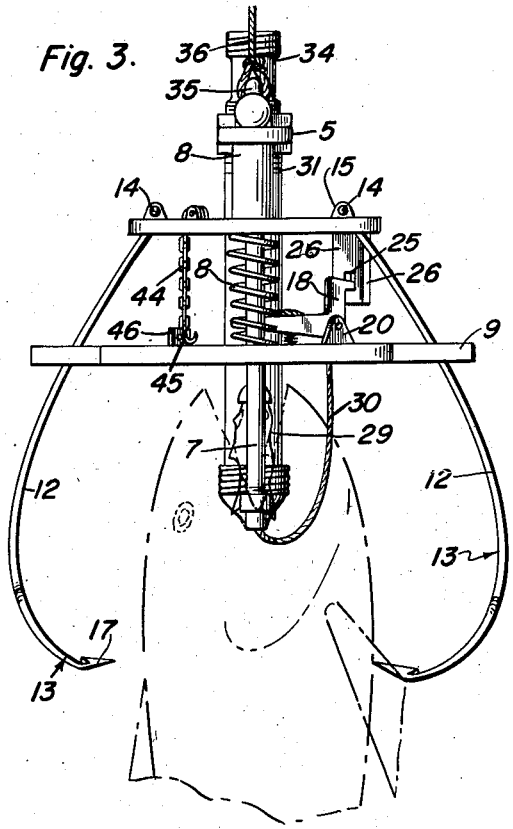
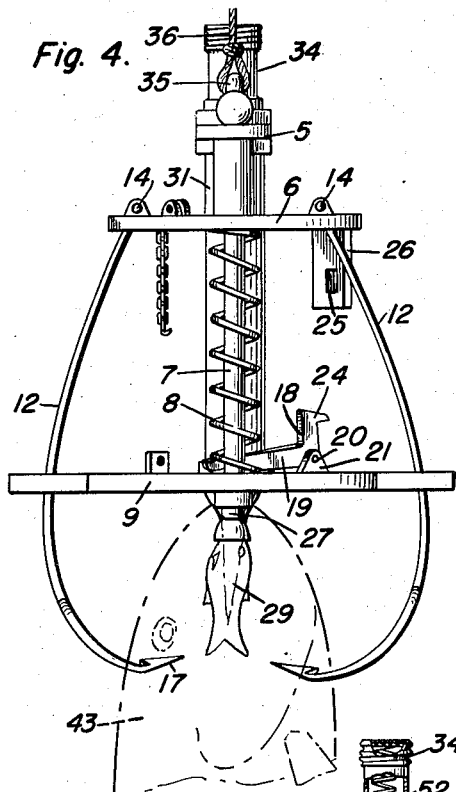
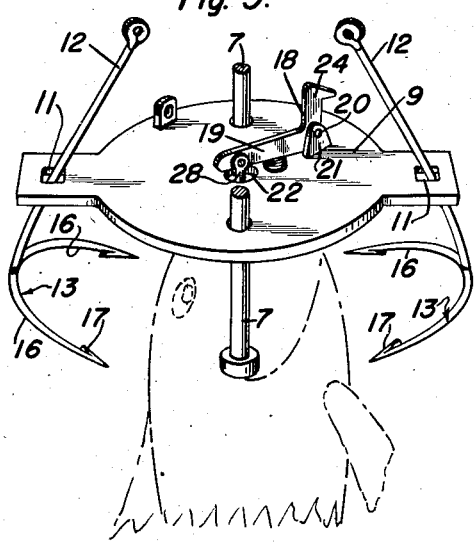
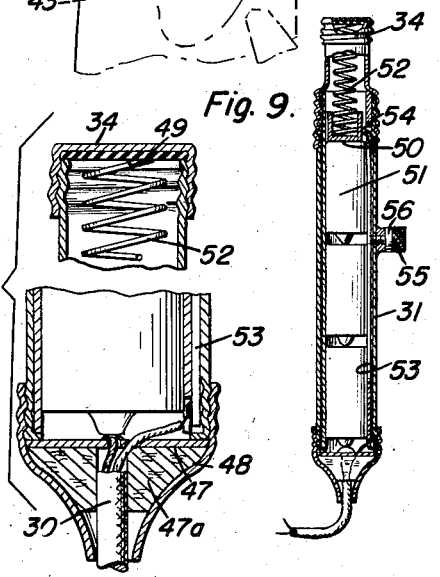
Lester E. Poston
INVENTOR.

Patented Aug. 25, 1953

2,649,802

UNITED STATES PATENT OFFICE 2,649,802

TRAP HOOK

Lester E. Poston, Algood, Tenn.

Application January 20, 1950, Serial No. 139,674

2 Claims. (Cl. 43—89)

The present invention relates to new and useful improvements in fishing hooks and more particularly to a trap hook for swinging a plurality of hooks into a gripping engagement with a fish when striking the bait to firmly hold the fish and prevent its loss.

An important object of the invention is to provide a plurality of swingably supported fishing hooks functioning as a grapples or jaws with trigger released springs means for closing the jaws upon a fish.

A further object of the invention is to provide novel means for suspending the bait from the trigger in a position for closing the jaws about the fish when striking the bait.

A still further object is to provide illuminating means for the bait connected with a self contained electric circuit carried by the trap hook.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view,

Figure 2 is a side elevational view,

Figure 3 is a similar view and showing the trap set and also showing the position of a fish when striking the bait, Figure 4 is a side elevational view showing the trap sprung for closing the grapple or jaws about the fish, Figure 5 is a perspective view of the jaw actuating plate, Figure 6 is a perspective view of a modified jaw actuating plate construction for use with four jaws, Figure 7 is an enlarged fragmentary side elevational view of the clamp for the bait, Figure 8 is an enlarged fragmentary vertical sectional view of the top and bottom caps for the battery case, Figure 9 is a vertical sectional view of the battery, and Figure 10 is a fragmentary view partly in vertical section and partly in side elevation illustrating the hanger for the lamp socket.

Referring now to the drawings in detail and first with respect to the form of invention illustrated in Figures 1 to 5 inclusive a numeral 5 designates an upper elongated plate, connected to a lower circular plate or disk 6 by a pair of rods 7 with spacing sleeves 8 on the rod between plates 5 and 6. A jaw actuating plate 9 is slidably mounted on the lower ends of rods 7, the rods having heads 10 at their lower ends preventing separation of plate 9 therefrom and coil springs 11 are positioned on rods 7 between plates 6 and 9 to slide plate 9 downwardly on the rods.

Plate 9 is formed with slotted openings 11 in which the shanks 12 of fish hook type grapples or jaws 13 are slidably received, the upper ends of the shanks being pivoted on pins 14 supported in apertured ears or lugs 15 on plate 6. Jaws 13 are curved inwardly at their lower ends toward the center of plate 9 and the lower ends of the jaws 13 are preferably provided with double bills 16 formed with barbs 17.

A trigger 18 is constructed to provide a substantially horizontal arm 19 pivoted at one end on a pin 20 supported in apertured ears or lugs 21 on plate 9, the free end of arm 19 overlying a central opening 22 in plate 9 and the free end of arm 19 is also formed with an opening 23. The pivoted end of trigger 18 is formed with an upwardly extending hook 24 received in an opening 25 in a downwardly extending lug 26 formed at one edge of plate 6 to hold plate 9 in a raised position and with springs 11 placed under tension. A coil spring 18' between the horizontal arm 19 and plate 9 biases said trigger 18 to enter the hook 24 in the opening 25.

A waterproof lamp socket 27 is supported beneath plate 9 by a hanger 28 extending upwardly through opening 22 and attached to opening 23 in arm 19. A lamp 29 is connected in socket 27 and is shaped to simulate a fish such as a minnow or other bait, the lamp preferably being constructed of a yieldable plastic material and may be colored or otherwise suitably ornamented.

A circuit wire 30 extends from socket 27 upwardly through central opening 22 in plate 9 and to the lower end of a battery case 31 connected in an opening 32, indicated by dotted lines in Figure 2, in one end of upper plate 5 by means of nuts 33 threaded on the battery case. The upper end of battery case 31 is provided with a cap 34 by means of which batteries may be placed in the case.

The upper end of one of the rods 7 is provided with an eye 35 by means of which a fish line 36 may be attached thereto.

In Figure 6 I have illustrated a modified jaw actuating plate 37 for use with four jaws 38 positioned in slots 39, the jaws being arranged in the form of a square and pivoted at their upper ends to an upper plate 40, in the manner heretofore described. The construction of the trap hook otherwise remains the same as that shown in Figures 1 to 5 inclusive.

In Figure 7 a clip 41 of a conventional type is connected to arm 19 of trigger 18 by means of a swivel 42 for gripping a live minnow for use as bait in place of the illuminated bait 29.

In the operation of the device a fish line is attached to eye 35 to lower the trap in the water. Trigger 18 holds plate 9 upwardly to hold grapples or jaws 12 open, as shown in Figure 2. The illuminated bait 29 will attract fish when night fishing and in daylight bait holding clip 41 may be used.

A fish 43 upon striking the bait will release trigger 18 whereupon springs 11 will force plate 9 downwardly and swing grapples or jaws 12 inwardly into their closed position, as shown in Figure 4 to cause hooks 13 to grip and hold the fish.

The trap may be locked in a set position, while handling the same, by means of a chain 44 attached to plate 6 and having a hook 45 at its free end for engaging an eye 46 on plate 9.

Battery case 31 is of water tight construction with a gasket 47 and cork filler block 47a between the lower end of the case and lower cap 48 and a gasket 49 between the upper end of the case and upper cap 34.

The batteries 51 are placed in an inverted position in case 31 and a cup 50 is held in contact with the base terminal of the uppermost battery in the case by a coil spring 52 compressed against the underside of upper cap 34 and a leaf spring switch 53 is positioned longitudinally between the case and the batteries and with one of the circuit wires 30 attached to the lower end of the leaf spring and with an inwardly projecting lip 54 at the upper end of the leaf spring movable into contact with the cup 50 by a screw 55 threaded in one side of the case to open and close the switch for the lamp 29.

The switch is held in its closed position by threading screw 55 inwardly to maintain the lamp energized while the device is in its lowered position in the water and the screw is kept watertight by a rubber washer 56.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A trap hook comprising an upper plate, a pair of rods extending downwardly therefrom and having heads on the lower ends thereof, a lower plate slidable downwardly on the rods into engagement with said heads and having a central aperture therein, springs on the rods between said plates sliding the lower plate downwardly, a plurality of jaws pivoted to the upper plate and on which the lower plate is slidable for opening and closing the jaws, a trigger pivoted on the lower plate on top thereof with one end overlying said aperture and adapted for suspending a bait holder depending through said aperture, and a lug on said upper plate depending from one side edge thereof engaging said trigger to hold the lower plate raised.

2. A trap according to claim 1 wherein said trigger is provided with an upstanding hook and said lug is provided with an aperture receiving said hook.

LESTER E. POSTON.

References Cited in the file of this patent
UNITED STATES PATENTS

| Number | Name | Date |
|---|---|---|
| 189,805 | Smith | Apr. 17, 1877 |
| 757,077 | Whipple | Apr. 12, 1904 |
| 834,495 | Sandefur | Oct. 30, 1906 |
| 1,009,968 | Herrmann | Nov. 28, 1911 |
| 1,663,465 | Neff | Mar. 20, 1928 |
| 2,525,109 | Abbott | Oct. 10, 1950 |